United States Patent
Gerster et al.

(10) Patent No.: US 8,170,974 B2
(45) Date of Patent: May 1, 2012

(54) FORECASTING ASSOCIATION RULES ACROSS USER ENGAGEMENT LEVELS

(75) Inventors: David Gerster, Burlingame, CA (US); Amr Awadallah, Palo Alto, CA (US); Sajjit Thampy, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 967 days.

(21) Appl. No.: 12/168,758

(22) Filed: Jul. 7, 2008

(65) Prior Publication Data
US 2010/0005040 A1     Jan. 7, 2010

(51) Int. Cl.
*G06F 17/00*     (2006.01)
*G06N 5/02*     (2006.01)

(52) U.S. Cl. ........................................ 706/47

(58) Field of Classification Search .............. 706/45–48, 706/52, 55; 705/7.11, 7.29, 7.33
See application file for complete search history.

(56) References Cited

U.S. PATENT DOCUMENTS

| | | | |
|---|---|---|---|
| 7,356,761 B2 * | 4/2008 | Karadimitriou et al. | 706/45 |
| 7,668,793 B2 * | 2/2010 | Beekmann et al. | 706/45 |
| 2006/0047617 A1 * | 3/2006 | Bacioiu et al. | 706/59 |
| 2007/0244739 A1 * | 10/2007 | Soito et al. | 705/10 |
| 2008/0288430 A1 * | 11/2008 | Friedlander et al. | 706/46 |
| 2009/0018897 A1 * | 1/2009 | Breiter | 705/10 |

* cited by examiner

*Primary Examiner* — Jeffrey A Gaffin
*Assistant Examiner* — Benjamin Buss
(74) *Attorney, Agent, or Firm* — SNR Denton US LLP

(57) ABSTRACT

A method of determining one or more association rules includes: specifying site-sequence values for users, wherein each user is identified with one of a plurality of engagement levels, and the site-sequence values indicate a sequence from a first site to a second site for at least one user identified with a corresponding engagement level; determining cumulative site-sequence values from the site-sequence values for combinations of pairs of sites and distinct engagement levels; determining likelihood values from the cumulative site-sequence values, wherein the likelihood values characterize probabilities for sequences between sites at distinct engagement levels; determining one or more association rules for pairs of sites from one or more corresponding likelihood values at one or more engagement levels, wherein each association rule indicates a sequential association between a corresponding pair of sites; determining one or more confidence values for the one or more association rules by calculating one or more variations of the likelihood values across the engagement levels; and saving one or more values for the one or more associations rules (e.g., likelihood values or confidence values).

21 Claims, 4 Drawing Sheets

US 8,170,974 B2

FORECASTING ASSOCIATION RULES ACROSS USER ENGAGEMENT LEVELS

BACKGROUND OF THE INVENTION

1. Field of Invention

The present invention relates to associating indexed values generally and more particularly to associating user activity based on overall system activity.

2. Description of Related Art

There is widespread need with large ad networks like Yahoo! to be able to sell targeted advertisement to users. A key component in realizing this vision is the development of technology that enables a system like Yahoo! to capture and utilize the behavioral profile of a user including, for example, associations between user preferences and user activities (e.g. the likelihood for visiting site B based on a visit to site A). Users who opt in and choose to reveal information about their behavior habits tend to generally be the more engaged group of users (e.g., as measured by time logged into the Internet). This biases any learning we get out of such data towards the more engaged set of users who form a small portion of overall traffic. However, application to less engaged (e.g., less frequent) users is not generally covered by analyzing more engaged users.

Thus, there is a need for improved methods to forecast association rules for user activity across user engagement levels.

SUMMARY OF THE INVENTION

In one embodiment of the present invention, a method of determining one or more association rules includes: specifying site-sequence values for users, wherein each user is identified with one of a plurality of engagement levels, and the site-sequence values indicate a sequence from a first site to a second site for at least one user identified with a corresponding engagement level; determining cumulative site-sequence values from the site-sequence values for combinations of pairs of sites and distinct engagement levels; determining likelihood values from the cumulative site-sequence values, wherein the likelihood values characterize probabilities for sequences between sites at distinct engagement levels; determining one or more association rules for pairs of sites from one or more corresponding likelihood values at one or more engagement levels, wherein each association rule indicates a sequential association between a corresponding pair of sites; determining one or more confidence values for the one or more association rules by calculating one or more variations of the likelihood values across the engagement levels; and saving one or more values for the one or more associations rules (e.g., likelihood values or confidence values).

According to one aspect of this embodiment, the site-sequence values may correspond to pairs of Internet sites, and the method further may further include: identifying the engagement levels for the users by measuring Internet time usage for the users; and specifying the site-sequence values for pairs of sites and a given user by identifying pairs of sites visited in sequence by the given user.

According to another aspect, determining the cumulative site-sequence values may include calculating cumulative sums of indicator values for a given first site, a given second site, and a given engagement level.

According to another aspect, determining the likelihood values may include scaling the cumulative site-sequence values for a given first site and a given engagement level to characterize probabilities for a range of second sites.

According to another aspect, determining the one or more association rules for pairs of sites may include specifying a sequential association between a pair of sites that satisfy a maximum likelihood property for the likelihood values.

According to another aspect, determining the one or more confidence values may include calculating at least one variation of the likelihood values for a given pair of sites over a range of engagement levels.

According to another aspect, saving the one or more values for the one or more association rules may include storing the one or more values in a computer-readable medium.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer.

In these ways the present invention enables improved methods to forecast association rules for user activity across user engagement levels.

DETAILED DESCRIPTION OF EXEMPLARY EMBODIMENTS

Figure 1:
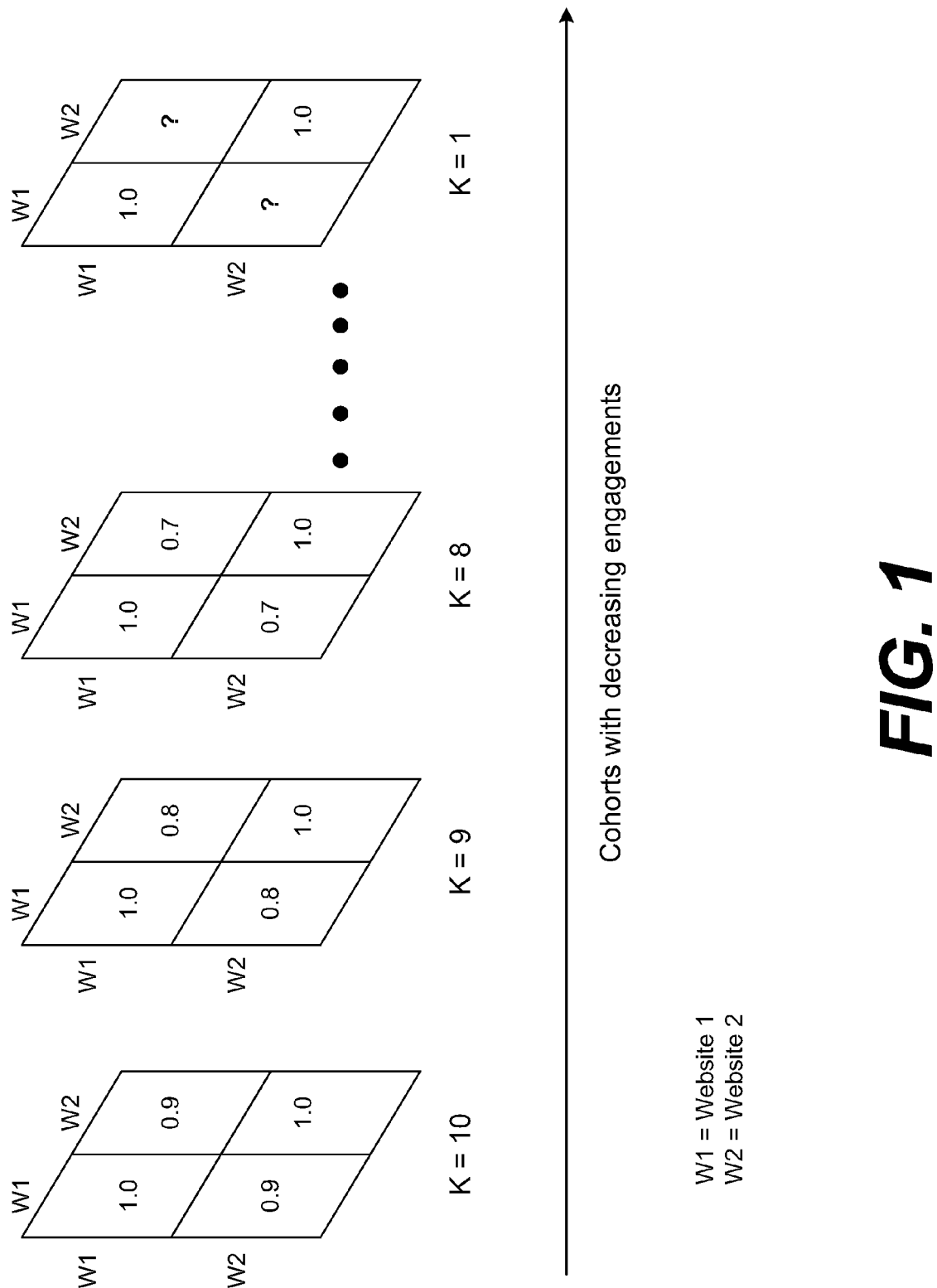
FIG. 1 shows an embodiment of the present invention directed to user activity on the Internet with different levels of user engagement.

FIG. 1 shows an embodiment of the present invention directed to user activity on the Internet with different levels of user engagement. User activity can be measured by site activity (e.g., logging into the site or making a purchase at the site). User engagement can be measured by user time on the Internet or some more specific Internet activity such as logging into new sites with a sufficient frequency or rapidity. Users can therefore be divided into cohorts (e.g., groupings) based on engagement levels.

In FIG. 1 cohorts are indexed the parameter K=1, ... 10, where larger values indicate greater engagement. For each K value a 2×2 matrix is used to represent sequential relationship between web sites represented by row and column indices. For example, let the row-indexed websites denote the present activity site (or login site) for a user. Then the matrix values could represent the probability of logging into the column-indexed website (e.g., within a period of time or before logging off the Internet). That is, each entry represents an association rule of the form "website A⇒website B" with a certain probability P(A⇒B).

Then for this example users of the K=10 cohort have a probability (or likelihood) of 0.9 of visiting website W2 from website W1 and a probability of 0.9 of visiting website W1 from website W2. Assuming that these values are more readily available for relatively high values of K, one can used averages or extrapolations to get values for the lower values of K (e.g., off-diagonal values for the K=1 case where "?" is shown). Uniformity for these probability values across engagement can be used to measure the confidence or reliability of using higher K values to estimate these entries (e.g., by averages or extrapolations) as discussed below.

Figure 2:
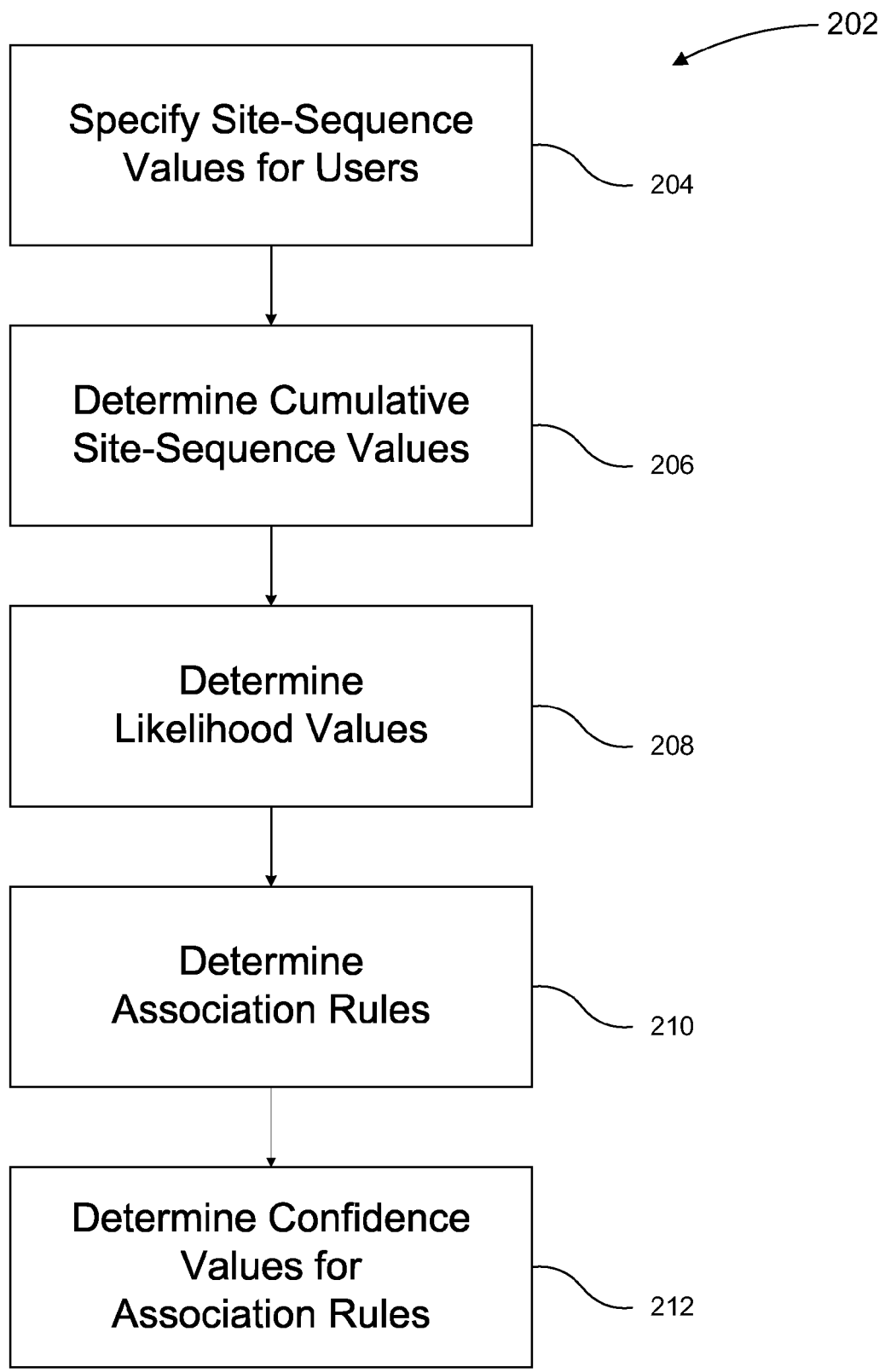
FIG. 2 shows a method of determining one or more association rules for an embodiment of the present invention.

FIG. 2 shows an embodiment of the present invention. A method of determining one or more association rules 202 includes specifying site-sequence values for the users 204, determining cumulative site-sequence values for combinations of pairs of sites and distinct engagement levels 206, determining likelihood values from the cumulative site-sequence values 208, determining association rules for pairs of sites from corresponding likelihood values at one or more engagement levels 210, and determining confidence values for the association rules 212.

In specifying the site-sequence values 204, each user is typically identified with one of the engagement levels, and the site-sequence values indicate a sequence from a first site to a second site for users identified with a corresponding engagement level. For example, when the site-sequence values correspond to pairs of Internet sites, the user engagement levels can be identified by measuring Internet time usage for the users, and the site-sequence values can be an identification (or indicator) of pairs of sites visited in sequence by the users.

Typically the first step is to collect a cohort of users who have chosen to opt in to reveal their click stream information. As one specific example, we can choose the number of page views a user generated as a measure of that user's engagement level and break up the cohort of users into ten sub cohorts based on their deciles of engagement levels. Then, for example, if a user generates page views that fall in the 55th percentile, then that user would be allocated to cohort $C_5$.

Cumulative site-sequence values 206 can be can be determined by calculating running sums for pairs of sites at each distinct engagement levels, and the likelihood values 208 can be determined from the cumulative site-sequence values by scaling to give probability values that characterize the likelihood of a given pair-wise sequence at a distinct engagement levels Continuing with the specific example, next we compile a list of unique websites the users in the cohort visited (numbering $N^k$ (say)) and generate a square $N^k \times N^k$ matrix. Every entry is initialized to 0 and represents the number of times a user visits website $W_j$ after $W_i$ for cohort k. This allows us to generate a probability measure for the rule "User visiting website $W_i$ also visits $W_j$". It is assumed that the user visits at least two websites or more so that the diagonal entry $c_{i,j}^k$ can be set to 0 for simplicity. This can be formulated thus:

$$P(W_i^k \Rightarrow W_j^k) = \frac{c_{i,j}^k}{\sum_{j=1}^{N} c_{i,j}^k}$$

$$= P_{i,j}^k$$

Thus association rules 210 can be determined for pairs of sites at given engagement levels to characterize sequential associations between sites (e.g., from a first site to a second site). These can be of the form described above: "website A ⇒website B" with a certain probability $P(A \Rightarrow B)$. In order to restrict the number of association rules in some cases a single association rule can be chosen for a website A and a cohort k, for example, by taking the maximum likelihood solution that corresponds to the maximum probability value.

Then confidence values can be determined 212 for the applying the association rules at other engagement values by calculated variations in the probability values across a range of engagement values. It is usually seen that the strength of the association rules become weaker as we step down the levels of engagement of cohorts. In order to be able to forecast the association rule, we look at how $P_{i,j}^k$ decays as we change k from 10 to 1. However, as only the highly engaged users (cohorts $C_{10}$, $C_9$ . . . ) choose to reveal their clickstream, the $P_{i,j}^k$ value for lower values of k may not exist, and we try to predict if the association rule holds for lower values of k.

We achieve this by setting threshold limits on first and second derivative of $P_{i,j}^k$ w.r.t. k. For example, if the second derivative is greater than or equal to some negative threshold −θ, then the association rule Rule($W_i \Rightarrow W_j$) can be assumed to be true for lower values of k:

$$\text{Rule}(W_i \Rightarrow W_j) \text{ is } \begin{cases} \text{NOT true} & \text{if } \frac{\partial^2 P_{i,j}^k}{\partial k^2} > -\theta \\ \text{true} & \text{if } \frac{\partial^2 P_{i,j}^k}{\partial k^2} \leq -\theta \end{cases}$$

In the discrete case, this derivative can be calculated as a discrete difference:

$$\frac{\partial^2 P_{i,j}^9}{\partial k^2} = \frac{P_{i,j}^{10} - 2P_{i,j}^9 + P_{i,j}^8}{3}.$$

As different rules can have different lowest k value we average out the various values of the second derivative, in case there are more than three $P_{i,j}$ values.

Similar expressions hold for the first-derivative of $P_{i,j}^k$ w.r.t. k. For example, if the first derivative is greater than or equal to some negative threshold −θ, then the association rule Rule($W_i \Rightarrow W_j$) can be assumed to be true for lower values of k:

$$\text{Rule}(W_i \Rightarrow W_j) \text{ is } \begin{cases} \text{NOT true} & \text{if } \frac{\partial P_{i,j}^k}{\partial k} > -\theta \\ \text{true} & \text{if } \frac{\partial P_{i,j}^k}{\partial k} \leq -\theta \end{cases}$$

And similarly as above, this derivative can be calculated as a discrete difference:

$$\frac{\partial P_{i,j}^9}{\partial k} = \frac{P_{i,j}^{10} - P_{i,j}^8}{2}.$$

These confidence checks can be carried out for both the first and second derivatives with a relatively small value of θ (e.g., θ=0.1). The confidence check can also be applied to just the first-order derivative or to just the second-order derivative. Alternatively higher-order derivatives (e.g., third order) can be included. Different threshold values can be used for different for each derivative according to the requirements of the operational setting.

At least some values for the results of the method can be output to a user or saved for subsequent use. For example the probability values and confidence-checking values can be saved directly for applications as in web traffic modeling. Alternatively, some derivative or summary form of the results (e.g., averages, interpolations, etc.) can be saved for later use according to the requirements of the operational setting.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof. For example, the system may be configured as part of a computer network that includes the Internet. At least some values for the results of the method can be saved, either in memory (e.g., RAM (Random Access Memory)) or permanent storage (e.g., a hard-disk system) for later use.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Figure 3:
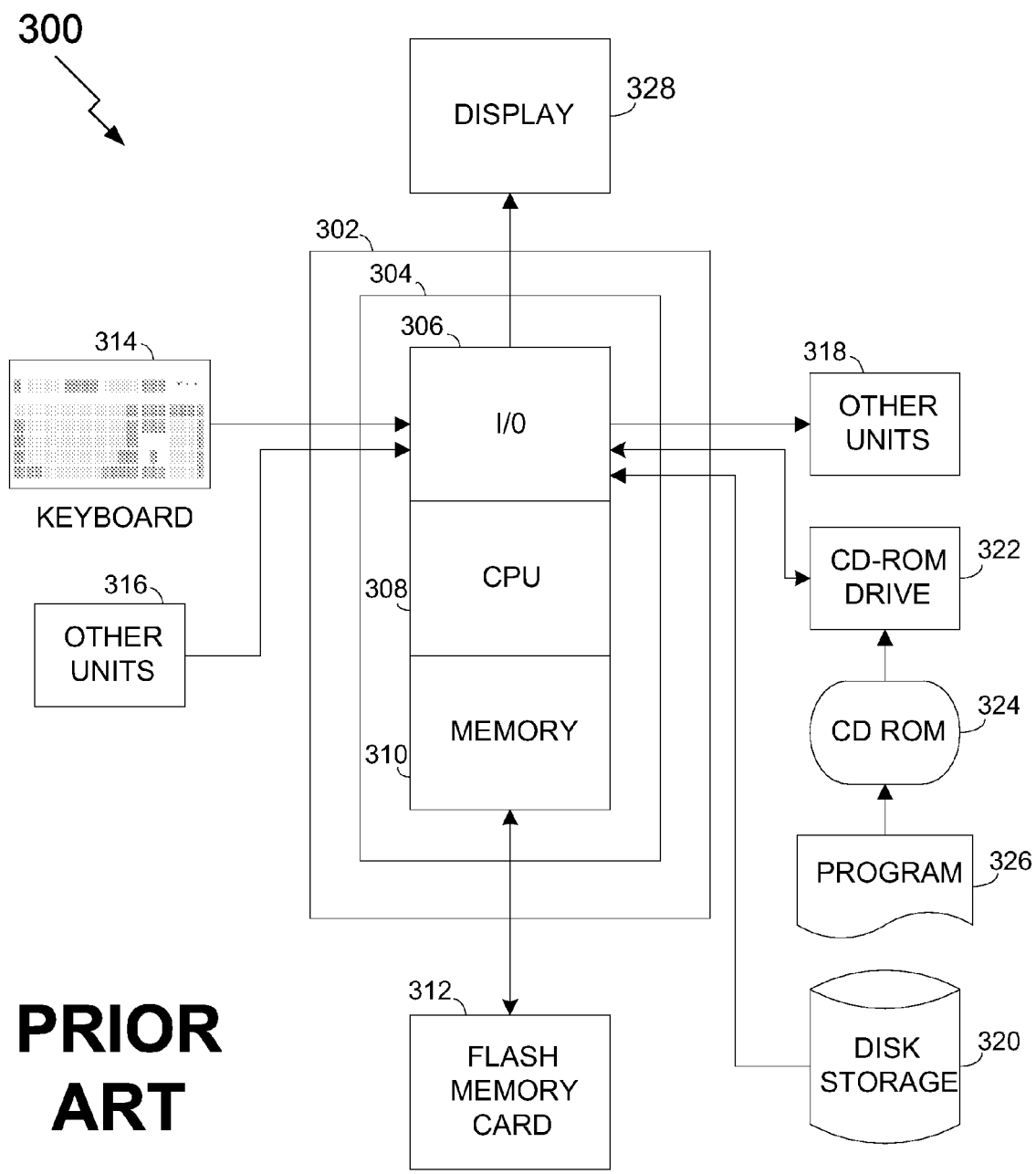
FIG. 3 shows a conventional general-purpose computer.

As described above, certain embodiments of the present invention can be implemented using standard computers and networks including the Internet. FIG. 3 shows a conventional general purpose computer 300 with a number of standard components. The main system 302 includes a motherboard 304 having an input/output (I/O) section 306, one or more central processing units (CPU) 308, and a memory section 310, which may have a flash memory card 312 related to it. The I/O section 306 is connected to a display 328, a keyboard 314, other similar general-purpose computer units 316, 318, a disk storage unit 320 and a CD-ROM drive unit 322. The CD-ROM drive unit 322 can read a CD-ROM medium 324 which typically contains programs 326 and other data.

Figure 4:
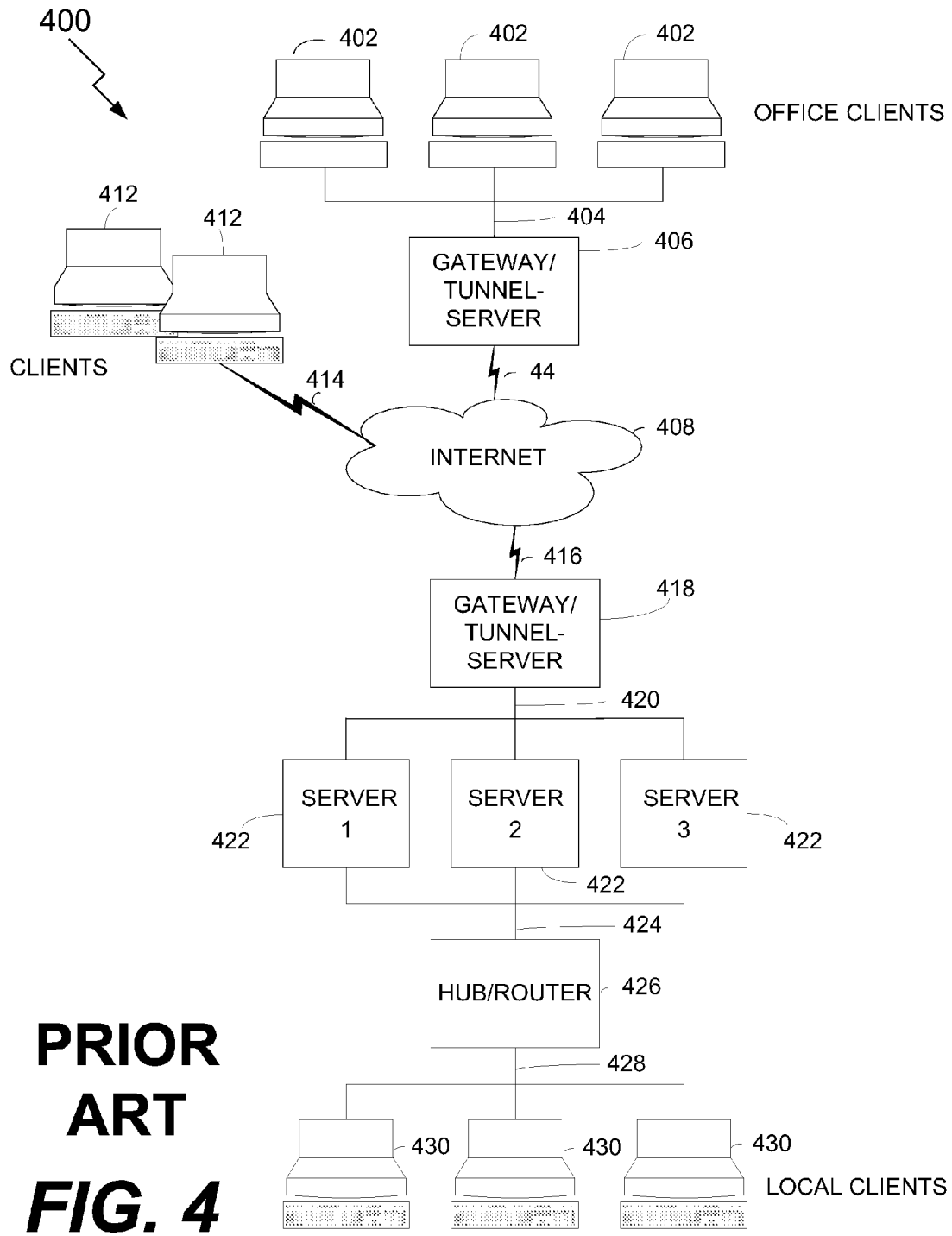
FIG. 4 shows a conventional Internet network configuration.

FIG. 4 shows a conventional Internet network configuration 400, where a number of office client machines 402, possibly in a branch office of an enterprise, are shown connected 404 to a gateway/tunnel-server 406 which is itself connected to the Internet 408 via some internet service provider (ISP) connection 410. Also shown are other possible clients 412 similarly connected to the internet 408 via an ISP connection 414. An additional client configuration is shown for local clients 430 (e.g., in a home office). An ISP connection 416 connects the Internet 408 to a gateway/tunnel-server 418 that is connected 420 to various enterprise application servers 422. These servers 422 are connected 424 to a hub/router 426 that is connected 428 to various local clients 430.

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of determining one or more association rules, comprising:

specifying a plurality of site-sequence values for a plurality of users, wherein each user is identified with one of a plurality of engagement levels, and the site-sequence values indicate a sequence from a first site to a second site for at least one user identified with a corresponding engagement level;

determining cumulative site-sequence values from the site-sequence values for combinations of pairs of sites and distinct engagement levels;

determining likelihood values from the cumulative site-sequence values, wherein the likelihood values characterize probabilities for sequences between sites at distinct engagement levels;

determining one or more association rules for pairs of sites from one or more corresponding likelihood values at one or more engagement levels, wherein each association rule indicates a sequential association between a corresponding pair of sites;

determining one or more confidence values for the one or more association rules by calculating one or more variations of the likelihood values across the engagement levels; and saving one or more values for the one or more associations rules.

2. A method according to claim 1, wherein the site-sequence values correspond to pairs of Internet sites, and the method further comprises:

identifying the engagement levels for the users by measuring Internet time usage for the users; and specifying the site-sequence values for pairs of sites and a given user by identifying pairs of sites visited in sequence by the given user.

3. A method according to claim 1, wherein determining the cumulative site-sequence values includes calculating cumulative sums of indicator values for a given first site, a given second site, and a given engagement level.

4. A method according to claim 1, wherein determining the likelihood values includes scaling the cumulative site-sequence values for a given first site and a given engagement level to characterize probabilities for a range of second sites.

5. A method according to claim 1, wherein determining the one or more association rules for pairs of sites includes specifying a sequential association between a pair of sites that satisfy a maximum likelihood property for the likelihood values.

6. A method according to claim 1, wherein determining the one or more confidence values includes calculating at least one variation of the likelihood values for a given pair of sites over a range of engagement levels.

7. A method according to claim 1, wherein saving the one or more values for the one or more association rules includes storing the one or more values in a computer-readable medium.

8. An apparatus for determining one or more association rules, the apparatus comprising a computer for executing computer instructions, wherein the computer includes computer instructions for:

specifying a plurality of site-sequence values for a plurality of users, wherein each user is identified with one of a plurality of engagement levels, and the site-sequence values indicate a sequence from a first site to a second site for at least one user identified with a corresponding engagement level;

determining cumulative site-sequence values from the site-sequence values for combinations of pairs of sites and distinct engagement levels;

determining likelihood values from the cumulative site-sequence values, wherein the likelihood values characterize probabilities for sequences between sites at distinct engagement levels;

determining one or more association rules for pairs of sites from one or more corresponding likelihood values at one or more engagement levels, wherein each association rule indicates a sequential association between a corresponding pair of sites;

determining one or more confidence values for the one or more association rules by calculating one or more variations of the likelihood values across the engagement levels; and saving one or more values for the one or more associations rules.

9. An apparatus according to claim 8, wherein the site-sequence values correspond to pairs of Internet sites, and the computer further includes computer instructions for:

identifying the engagement levels for the users by measuring Internet time usage for the users; and specifying the site-sequence values for pairs of sites and a given user by identifying pairs of sites visited in sequence by the given user.

10. An apparatus according to claim 8, wherein determining the cumulative site-sequence values includes calculating cumulative sums of indicator values for a given first site, a given second site, and a given engagement level.

11. An apparatus according to claim 8, wherein determining the likelihood values includes scaling the cumulative site-sequence values for a given first site and a given engagement level to characterize probabilities for a range of second sites.

12. An apparatus according to claim 8, wherein determining the one or more association rules for pairs of sites includes specifying a sequential association between a pair of sites that satisfy a maximum likelihood property for the likelihood values.

13. An apparatus according to claim 8, wherein determining the one or more confidence values includes calculating at least one variation of the likelihood values for a given pair of sites over a range of engagement levels.

14. An apparatus according to claim 8, wherein the computer includes a processor with memory for executing at least some of the computer instructions.

15. An apparatus according to claim 8, wherein the computer includes circuitry for executing at least some of the computer instructions.

16. A computer-readable medium that stores a computer program for determining one or more association rules, wherein the computer program includes instructions for:

specifying a plurality of site-sequence values for a plurality of users, wherein each user is identified with one of a plurality of engagement levels, and the site-sequence values indicate a sequence from a first site to a second site for at least one user identified with a corresponding engagement level;

determining cumulative site-sequence values from the site-sequence values for combinations of pairs of sites and distinct engagement levels;

determining likelihood values from the cumulative site-sequence values, wherein the likelihood values characterize probabilities for sequences between sites at distinct engagement levels;

determining one or more association rules for pairs of sites from one or more corresponding likelihood values at one or more engagement levels, wherein each association rule indicates a sequential association between a corresponding pair of sites;

determining one or more confidence values for the one or more association rules by calculating one or more variations of the likelihood values across the engagement levels; and saving one or more values for the one or more associations rules.

17. A computer-readable medium according to claim 16, wherein the site-sequence values correspond to pairs of Internet sites, and the computer program further includes instructions for:

identifying the engagement levels for the users by measuring Internet time usage for the users; and specifying the site-sequence values for pairs of sites and a given user by identifying pairs of sites visited in sequence by the given user.

18. A computer-readable medium according to claim 16, wherein determining the cumulative site-sequence values includes calculating cumulative sums of indicator values for a given first site, a given second site, and a given engagement level.

19. A computer-readable medium according to claim 16, wherein determining the likelihood values includes scaling the cumulative site-sequence values for a given first site and a given engagement level to characterize probabilities for a range of second sites.

20. A computer-readable medium according to claim 16, wherein determining the one or more association rules for pairs of sites includes specifying a sequential association between a pair of sites that satisfy a maximum likelihood property for the likelihood values.

21. A computer-readable medium according to claim 16, wherein determining the one or more confidence values includes calculating at least one variation of the likelihood values for a given pair of sites over a range of engagement levels.

* * * * *